(No Model.)
G. T. BOND.
FLOAT FOR FISH LINES.
No. 427,730. Patented May 13, 1890.
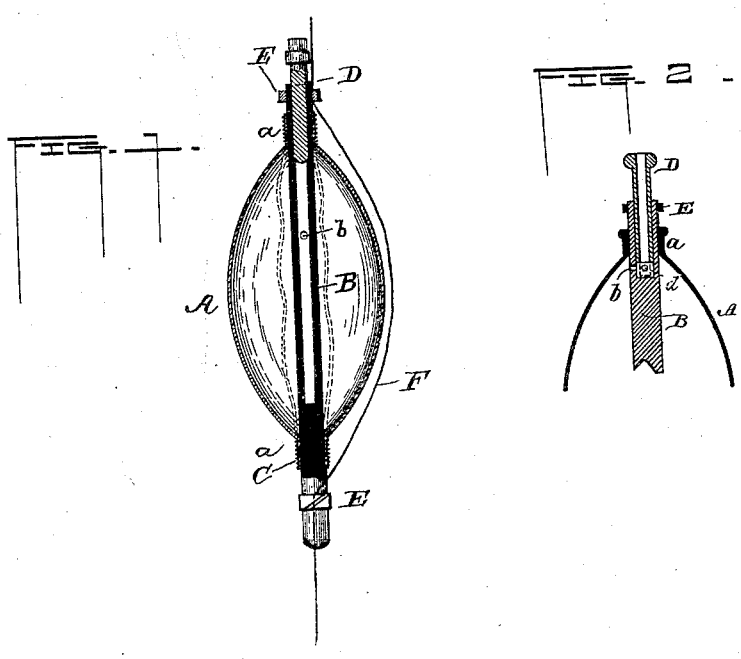
WITNESSES
INVENTOR
George T. Bond
BY HIS ATTORNEY

UNITED STATES PATENT OFFICE.

GEORGE TONY BOND, OF HUNTINGTON, WEST VIRGINIA.

FLOAT FOR FISH-LINES.

SPECIFICATION forming part of Letters Patent No. 427,730, dated May 13, 1890.

Application filed January 15, 1890. Serial No. 337,003. (No model.)

*To all whom it may concern:*

Be it known that I, GEORGE TONY BOND, a citizen of the United States, residing at Huntington, in the county of Cabell and State of West Virginia, have invented certain new and useful Improvements in Floats for Fish-Lines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to fishing-tackle, and its object is to provide a float adapted to be inflated when it is used and to be collapsed for convenience of transportation.

It is capable of a variety of alterations in shape, material, and construction, and also in the mode in which it can be used, as will be hereinafter set forth more or less in detail.

In the drawings, Figure 1 is a vertical sectional view of a float such as I have invented. Fig. 2 shows a modification of the stem and plug.

I make my float of any flexible elastic material impervious to air and water, such as rubber.

The form shown in Fig. 1 consists, preferably, when inflated, of an elliptic spheroidal bulb or body A, through which passes a stem B, of wood, rubber, or the like. The body A is preferably formed with two oppositely-disposed necks $a$ to fit the stem, to which they are tightly fastened in any suitable manner, as by a wrapping of thread or wire C, by cement, or the like. When the body is made of rubber, the necks $a$ can be formed of greater thickness than the expansible portion and of a diameter smaller than the stem, so that they will hug it so tightly when forced upon it as to dispense with all other fastenings, as shown in Fig. 2. The stem is tubular for a portion of its length, and its open end is provided with some suitable means for closing it, such as a plug or stopper D, fitting snugly into the tube. At some point within the body A an aperture $b$ is formed in the tubular portion of the stem.

When the body is to be inflated, the fisherman removes the plug D, applies the open end of the tube to his lips, and blows into it. The air passes through the aperture $b$ into the body A and quickly expands it to the required size. The plug D is then replaced and the float is ready for use. By removing the plug the air is allowed to escape and the float can be collapsed, as indicated in dotted lines.

Another mode of closing the stem is shown in Fig. 2. The plug D is made hollow and long enough to extend into the stem beyond the hole $b$, fitting the bore of the stem airtight. The plug may be open at its inner end, as shown, or it may be closed at the end and provided with a hole $d$, as indicated in dotted lines. In the former case the body can be inflated by drawing out the plug until its inner end is above the hole $b$, as shown, when the air blown into the plug will readily pass into the body. In the other case the plug need only be rotated in the stem until the holes $b$ and $d$ register.

A convenient mode of attaching the float to the line is to provide the stem B with the cut rings E, sliding stiffly on the stem. The cleft E is preferably made obliquely, as shown. The line F can be easily inserted under the ring by guiding it through the cleft, and when in place will not detach itself.

One manner of using this float is as follows: A suitable length of line with the baited hook is fastened to the float, which is then set adrift on the surface of a stream or pond. The fisherman may use any number of them, and sits in his boat watching them. When a fish is hooked, the fact is indicated by the movements of the float, which can be followed and picked up.

One of the advantages of my invention is that the float can be easily removed from the line and collapsed flat for shipment or for carrying in the pocket.

Another advantage lies in the possibility of adapting the size of the float to the kind of fish that is baited for, the size depending in part upon the greater or less inflation of the body A. If the body is made of thin elastic rubber, it admits of very considerable variation in this respect.

My floats are adapted to nets as well as lines, and will be found of service in all kinds of fishing.

Having thus described my invention, what I claim, and desire to secure by Letters Patent, is—

1. The combination, with an inflatable and collapsible float composed of elastic material and having a tubular stem, of a fish-line fastened to said stem, substantially as described.

2. The combination, with the inflatable and collapsible body A, having the necks $a$, of the stem B, tubular for a portion of its length and having the aperture $b$, and the plug D, for closing the stem, substantially as described.

3. The combination, with the float A, having the stem B, of the obliquely-cut ring E, sliding stiffly on the stem and adapted to receive and hold a fish-line, substantially as described.

In testimony whereof I affix my signature in presence of two witnesses.

GEORGE TONY BOND.

Witnesses:
R. H. BAKER,
L. G. HAWKINS.